(12) United States Patent
Iyer et al.

(10) Patent No.: US 12,250,141 B2
(45) Date of Patent: Mar. 11, 2025

(54) PREFIX COMPRESSION ROUTES IN EXACT MATCH USING REDIRECTION AND MIRRORING FECs IN HARDWARE

(71) Applicant: Arista Networks, Inc., Santa Clara, CA (US)

(72) Inventors: Ramakrishnan Iyer, Karnataka (IN); Vishal Bandekar, Karnataka (IN); Niranjan Nagaraju, Karnataka (IN); Sriram Sellappa, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/867,520

(22) Filed: Jul. 18, 2022

(65) Prior Publication Data

US 2023/0254240 A1 Aug. 10, 2023

(30) Foreign Application Priority Data

Feb. 5, 2022 (IN) .............................. 202241006249

(51) Int. Cl.
*H04L 45/24* (2022.01)
*H04L 45/42* (2022.01)
*H04L 45/748* (2022.01)

(52) U.S. Cl.
CPC .............. *H04L 45/24* (2013.01); *H04L 45/42* (2013.01); *H04L 45/748* (2013.01)

(58) Field of Classification Search
CPC ........ H04L 45/24; H04L 45/42; H04L 45/748
See application file for complete search history.

(56) References Cited

U.S. PATENT DOCUMENTS

| | | | |
|---|---|---|---|
| 9,985,885 B1* | 5/2018 | Singh | H04L 45/741 |
| 10,027,587 B1 | 7/2018 | O'Brien et al. | |
| 2002/0080798 A1* | 6/2002 | Hariguchi | H04L 45/54 370/395.31 |
| 2005/0141517 A1* | 6/2005 | Choi | H04L 45/54 370/428 |
| 2011/0026403 A1* | 2/2011 | Shao | H04L 67/1001 370/235 |

(Continued)

OTHER PUBLICATIONS

International Search Report & Written Opinion, PCT/US2023/011896, dated Apr. 18, 2023, 17 pages.

*Primary Examiner* — Jeong S Park
(74) *Attorney, Agent, or Firm* — Fountainhead Law Group, PC (57) ABSTRACT

Prefix compression routes provided via exact match using redirection and mirroring Forwarding Equivalence Class entries in hardware. In a network device, a first table is stored having a first entry, a second table is stored having a second entry, and a third table is stored having a third entry including routing information for routing data packets. The first entry references a first memory location in the second table, the second memory location stores the second entry, and the second entry referencing a second memory location in the third table. A data packet is received, and the first entry is accessed based on a destination address of the data packet. Routing information is obtained as a result of accessing the first entry. The data packet is sent by the network device according to the routing information.

17 Claims, 7 Drawing Sheets

(56) References Cited

U.S. PATENT DOCUMENTS

| | | | |
|---|---|---|---|
| 2014/0153443 A1* | 6/2014 | Carter | H04L 45/48 |
| | | | 370/256 |
| 2017/0070431 A1* | 3/2017 | Nidumolu | H04L 12/4641 |
| 2021/0044516 A1* | 2/2021 | Sellappa | H04L 45/02 |
| 2021/0075724 A1* | 3/2021 | Nagre | H04L 45/20 |
| 2022/0006732 A1* | 1/2022 | Siemens | H04L 45/04 |

* cited by examiner

PREFIX COMPRESSION ROUTES IN EXACT MATCH USING REDIRECTION AND MIRRORING FECs IN HARDWARE

BACKGROUND

The present application relates to computer network technology and, more particularly, to storage of routing information in network devices.

In computer networks, network devices may provide switching (e.g., Layer 2 operations of the 7-layer Open Systems Interconnection Model) and/or routing (e.g., Layer 3 operations of the 7-layer Open Systems Interconnection Model) functionality. Some network devices may store routing information in memory for routing data packets in a network. The routing information may be stored in a data structure and the number of entries in the data structure is limited due to size constraints of hardware in the network device. In large networks, this size constraint may reduce routing efficiency and/or limit the design of a network.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

The present disclosure is directed to storage of routing information in network devices. In the following description, for purposes of explanation, numerous examples and specific details are set forth to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Network devices in computing networks may store routing information in memory for routing data packets through the network. Certain generations of network device hardware have modular memory for storing routing information in hardware. The routing information, more specifically, may be stored in a data structure (e.g., a routing table) and accessed based on an algorithm that identifies a match between an address and certain information stored in the data structure. Some algorithms implement matching to improve the efficiency of accessing a stored entry corresponding to the address. Routing tables stored in hardware of the network devices may include a Longest Prefix Match (LPM) table and an Exact Match (EM) table. LPM tables may efficiently store routes in hardware memory of the network device. However, there is a limited amount of modular memory that can be allocated to an LPM table due to constraints on the hardware.

To extend the route scale on some generations of network device hardware beyond what is currently possible, the present disclosure involves routing using an EM table to store additional entries. More particularly, the present disclosure involves compressing multiple routes in a routing table into a single entry in an EM table to increase the efficiency of the EM table. A next-hop selection may use more bits from a data packet than was initially implemented. This may be implemented in a programmable pipeline of the network device.

Due to the limited number of bits available per next-hop in a compressed route, Forwarding Equivalence Classes (FECs) in hardware are allocated to reach a FEC storing or having routing information associated therewith. In certain embodiments, the next-hop is reached via redirection FECs. In certain embodiments, contents of an original FEC are mirrored to a FEC reachable via a compressed route.

An exact match table is typically used for programming layer 2 addresses (e.g., media access control (MAC) addresses) when the network device is used as a network switch. A longest prefix match table is typically used to program layer 3 addresses when a network device is used as a router. For example, each entry in the tables may include an address and a next-hop re-write. The address may correspond to the destination of the packet and the next-hop re-write may be an address that is the next-hop for the packet. As the size of the number of available addresses grows over time, so too does the size of routing tables and the amount of memory involved in storing the routing tables.

One approach to addressing this issue is increasing the amount of memory in a network device storing such tables. However, this approach increases the cost of network devices and fails to utilize existing memory space in the network device that may be unused. The present disclosure provides prefix compression for route exact matching using forwarding equivalence class information in one or more tables stored in a memory of the network device.

System Architecture

Figure 1:
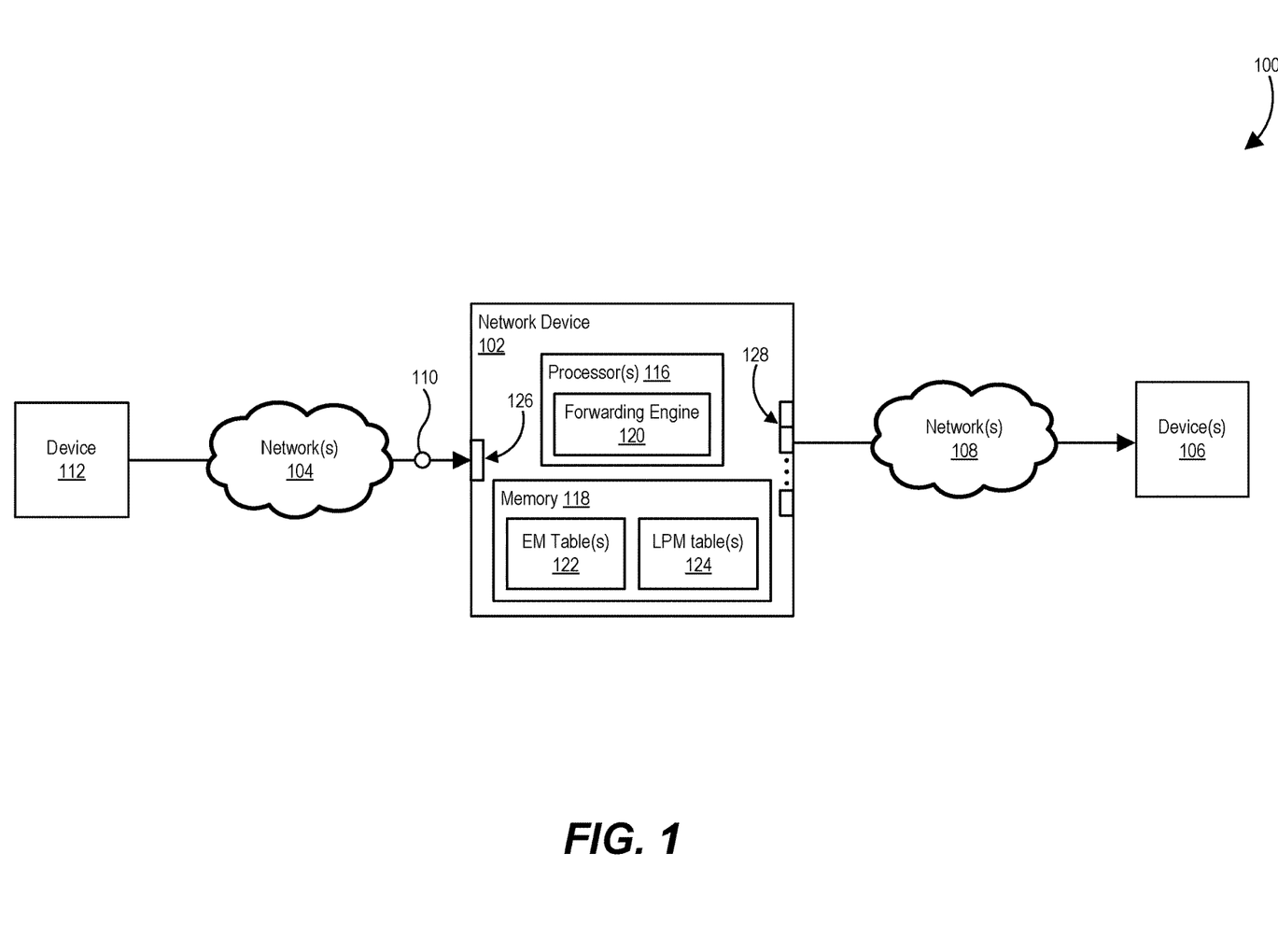
FIG. 1 illustrates an environment in which a network device processes network data according to one or more embodiments.

FIG. 1 illustrates environment 100 in which a network device processes network data according to one or more embodiments. Environment 100 includes network device 102 that receives data transmitted over one or more networks 104, processes the data, and sends the processed data to one or more devices 106 over one or more second networks 108. Non-limiting examples of device(s) 106 include servers and host devices (e.g., laptops, tablet computers, mobile devices). One or more devices 106 may be connected in a sub-network.

One or more networks 104 include a Layer 3 network over which network device 102 receives data packet 110 sent by device 112. Device 112 may be a network device in Layer 3 or a network layer of an Open System Interconnect (OSI) model. For instance, device 112 may be a network switch performing intra-network (e.g., intra-virtual local area network) operations, such as operations involving a label switching protocol.

One or more networks 108 include a Layer 2 network over which network device 102 sends a data packet to one or more devices 106. Network device 102 may be located at an edge of the Layer 2 network(s) over which data packet 110 is transmitted. The Layer 3 network(s) of one or more networks 104 may be a network external to the Layer 2 network of one or more networks 108. Data packet 110 may include a Layer 3 address, such as Internet Protocol (IP) addresses. Network device 102 may also transmit packets via a Layer 2 network of one or more networks 108 between devices 106. The data packet transmitted may include a Layer 2 address, such as a media access control (MAC) address. Network device 102 may implement Layer 2 addresses for communications with the one or more devices 106 and may operate as a network switch.

Network device 102 includes one or more processors 116 and memory 118 storing routing information. One or more processors 116 are configured to implement a forwarding engine 120 for forwarding data based on the routing information. Memory 118 includes modular memory storing sets of hardware routing tables. Memory 118 may store one or more Exact Match (EM) tables 122 and one or more Longest Prefix Match (LPM) tables 124. One or more processors 116 include one or more switching processor devices (e.g., Application Specific Integrated Circuits, System-on-Chips, Field Programmable Gate Arrays).

Memory 118, in some embodiments, includes a plurality of different memory types, such as volatile memory (e.g., cache memory, random-access memory) and/or non-volatile memory (e.g., solid-state memory). Memory 118 may store executable instructions that, as a result of execution by some of one or more processors 116, cause network device 102 to perform as described herein. Memory 118 may store a modular database that facilitates scaling of routing tables.

Forwarding engine 120 processes packets that are transmitted on a Layer 3 network or a Layer 2 network. Forwarding engine 120 may receive data packet 110, which includes a source address and a destination address, and determine a next-hop address for data packet 110 based on EM table(s) 122 and/or LPM table(s) 124.

In some embodiments, network device 102 uses a destination address to update a forwarding table using one or more specific prefix length keys and to make forwarding decisions for a destination address in a data packet to be processed. EM table(s) 122 is a table of forwarding entries that is used for an exact match address lookup of the destination address. Identification of a match using an exact match address lookup may involve a specific lookup that includes a subset of the destination Internet Protocol (IP) address matched with an entry in EM table(s) 122. For an exact match address lookup, a single match may be obtained; however, a plurality of results may be encoded for adjacent route lookups. In some embodiments, network device 102 stores routes in the exact match table with specific prefix lengths. For example, network device 102 may store routes that are 22 to 24 bits in length. Each of the entries may include a key and a corresponding result. In some embodiments, the key is a data element that is used to find a result in the exact match table, the result corresponding to a next-hop for a destination address matching the key.

Network device 102 includes a plurality of network interfaces that include first port 126 on which data packet 110 is received. The plurality of network interfaces of network device 102 also include plurality of second ports 128 for sending the data packet to device(s) 106. Network device 102 selects one of plurality of second ports 128 from which to send data packet 110 based on a destination address of data packet 110. In some embodiments, individual ports of second ports 128 are coupled to a corresponding subnet, which may be a destination subnet for data packet 110. Forwarding engine 120 includes a forwarding table (described further below) that forwarding engine 120 uses to determine which of the plurality of second ports 128 to use to transmit data packet 110.

In some embodiments, EM table(s) 122 and/or LPM table(s) 124 may store forwarding information. For example, EM table(s) 122 and/or LPM table(s) 124 may store routing table entries according to one or more routing protocols implemented by forwarding engine 120. Network device 102 may store routing table entries according to routing protocols such as routing information protocol (RIP), border gateway protocol (BGP), open shortest path first (OSPF), intermediate system-intermediate system (IS-IS), interior gateway routing protocol (IGRP), enhanced IGRP (EIGRP), and any/or other type of unicast routing protocol known in the art. In some embodiments, EM table(s) 122 and/or LPM table(s) 124 may store routing information for Internet Protocol version 4 (IPv4) and Internet Protocol version 6 (IPv6) addresses. In some embodiments, the forwarding information stored applies to virtual routing and forwarding (VRF) systems in which the VRF identifier is part of a key used for lookup in EM table(s) 122 and/or LPM table(s) 124.

EM table(s) 122 and/or LPM table(s) 124 may be stored in memory accessible by software operating on network device 102 (e.g., main memory of the network device 102) and/or be stored in hardware memory, such as specialized fast-performing hardware data structure(s) (e.g., ternary content-addressable memory (TCAM), a multi-level Trie). In some embodiments, EM table(s) 122 may store one or more hash tables having entries that correspond to hash values generated by performing a hashing operation involving a hash key. LPM table(s) 124 may include combinations of TCAM and/or multi-level hash table(s).

In some embodiments, entries in EM table(s) 122 and/or entries in LPM table(s) 124 may be routes and may include an address, an address range (e.g., a subnet), and/or a next-hop address. The next-hop address is associated with a device in a route to which a data packet will be transmitted next, such as an interface that is used by network device 102 to transmit a packet with an address that matches the entry. The interface may be connected to a network. For a given destination address, network device 102 performs a set of address lookups for the destination address using EM table(s) 122 and/or LPM table(s) 124. In some embodiments, network device 102 performs a plurality of address lookups concurrently.

In some embodiments, EM table(s) 122 and/or LPM table(s) 124 may be implemented as a single table or as multiple tables. In some embodiments, network device 102 uses EM table(s) 122 to identify one or more addresses that are an exact match with an address in a header of data packet 110. EM table(s) 122 may include a hash table that is used for exact match address lookup to determine a next-hop for data packet 110. One or more address routes in EM table(s) 122 may include key-value pairs. For instance, forwarding engine 120 may search for an entry in EM table(s) 122 that matches a key. If forwarding engine 120 identifies a match with the key, a value associated with the key is returned as a result of performing the lookup. In some embodiments, detection of a successful match includes an exact match with a key stored in EM table(s) 122. In some embodiments, EM table(s) 122 is stored in memory of a different type than a TCAM.

In some embodiments, EM table(s) 122 is used to perform address lookups for matches with specific prefix lengths. An address prefix length corresponds to a number of bits set in a subnet mask of the address. EM table(s) 122 may have a configuration specifying certain prefix lengths that are stored in an address route entry. In some embodiments, network device 102 uses EM table(s) 122 to lookup a single prefix length and may effectively store different prefix lengths for one or more keys. For instance, entries in EM table(s) 122 may be stored for 22-bit, 23-bit, and/or 24-bit prefixes or entries with different prefix lengths; however, identification of an exact match may be for addresses or portions thereof that are 21 bits in length. As a further example, routes with 24-bit length prefixes (e.g., /24) may be a common route stored in EM table(s) 122.

To perform an exact match address lookup using EM table(s) 122, network device 102 may generate a key of up to N bits of the destination address. In some embodiments, the network device 102 generates a plurality of keys based on the same destination address and uses the plurality of keys to perform multiple exact match address lookups for that destination address. In some embodiments, a key is used in exact match lookups for different prefix lengths in different exact match tables, wherein different lookups are distinguished using the key. For example, to perform both a 23-bit prefix lookup and a 19-bit lookup, a lookup operation for the 23-bit prefix would be followed by the first 23 bits of a destination IP address then all zeroes afterwards. A lookup operation for the 19-bit prefix would be followed by the first 19 bits of the destination IP address and then all zeroes. Performing multiple lookups (e.g., using EM table(s) 122 and/or LPM table(s) 124) with multiple keys may return multiple address lookup results. In some embodiments, forwarding engine 120 determines which lookup result is to be used for the destination address.

EM table(s) 122 may store multiple results in a single exact match table entry. If an exact match result is larger than the next-hop encoding or if the exact match table lookup is limited to fewer possible next-hops, forwarding engine 120 encodes a power of 2 next-hops per exact match table lookup. In such scenarios, forwarding engine 120 uses more bits from the destination address lookup to determine which of the actual next-hops is selected. For example, if a lookup for a /24 key in EM table(s) 122 is performed, wherein an entry is encoded with two next-hops per result, forwarding engine 120 can store two adjacent /25 routes as a single entry in the hash table. Forwarding engine 120 may then use bit 25 of the destination address to determine which of the next-hops to use.

Forwarding engine 120 can store shorter prefixes using multiple table entries in EM table(s) 122 in some embodiments. To perform lookups using 24-bit keys (e.g., looking up /24 routes in the hash table), forwarding engine 120 may store prefixes shorter than /24 routes using multiple entries of EM table(s) 122. For instance, a /23 route may be stored in EM table(s) 122 by inserting two /24 route entries in EM table(s) 122 by expanding the shorter /23 prefix into the two /24 prefixes. As another example, for a /22 route, network device 102 may expand the /22 route into four /24 routes. Expanding a shorter route into a longer route may involve padding a route with additional zeros or ones.

In some embodiments, network device 102 uses LPM table(s) 124 to store entries for a longest prefix match type of address lookup, but other types of lookups may be implemented. EM table(s) 122 and/or LPM table(s) 124 may have different types of lookups for address routes. Network device 102 may store entries in LPM table(s) 124 as key value pairs. In some embodiments, forwarding engine 120 uses the destination addresses as the key for the address lookup. Forwarding engine 120 may look up an entry in LPM table(s) 124 using the key. As a result of determining that the key is present, the lookup operation may return the value associated with the key.

In some situations, a plurality of matches may be identified in connection with a lookup operation using a single key. For example, a prefix used to perform a look-up may be associated with multiple keys in LPM table(s) 124. A key may be selected from LPM table(s) 124 having the greatest number of bits (e.g., the most specific key) that match the input address. If a first forwarding entry matches 16 bits of an input address and a second forwarding entry matches 24 bits of an address, for instance, forwarding engine 120 selects the second forwarding entry as the result for the longest prefix match lookup due to the greater number of matching bits. As a result of failing to identify a match between the key and an entry in a table, a default value may be returned. In some embodiments, LPM table(s) 124 may be a Trie data structure. In some embodiments, LPM table(s) 124 is stored in a TCAM in which some or all of the entries in LPM table(s) 124 can be searched concurrently or in parallel.

The forwarding engine 120 may use two different types of address lookups in some embodiments: an exact match address lookup using a key lookup with EM table(s) 122 and a longest prefix match address lookup using the address with LPM table(s) 124. In some embodiments, forwarding engine 120 can perform a longest prefix match address lookup and an exact match address lookup concurrently. Forwarding engine 120 may determine a next-hop for a destination address by performing an exact match address lookup and also performing a longest prefix match address lookup with the destination address. Forwarding engine 120 uses the results of the two address lookups and decides which result to use to determine a next-hop for the destination address. In some embodiments, forwarding engine 120 performs one or both lookups of the longest prefix match address lookup and the longest exact match lookup to determine a next-hop for the destination address.

In some embodiments, forwarding engine 120 performs the two address lookups concurrently by overlapping the time periods in which the two address lookups are performed. In some embodiments, the exact match address lookup may be preferred over the longest prefix match address lookup. In such situations, forwarding engine 120 may implement a policy in which more specific routes are stored in EM table(s) 122 rather than LPM table(s) 124. The appropriate result may be subsequently selected from results of EM table(s) 122 or results of LPM table(s) 124 based on the presence of hits on EM table(s) 122 lookups and/or the presence of hits on LPM table(s) 124 lookups.

Network device 102 may be used to transmit packets using Layer 3 addresses or transmit packets using Layer 2 addresses. Layer 3 addresses correspond to entries for transmitting packets using Layer 3 protocols and Layer 2 addresses correspond to entries for transmitting packets using Layer 2 protocols. As discussed herein, network device 102 may store Layer 2 and/or Layer 3 addresses in EM table(s) 122. To avoid over utilizing EM table(s) 122, network device 102 may set a higher threshold for EM table(s) 122 than for LPM table(s) 124. Using the threshold, network device 102 may avoid an overflow of entries in EM table(s) 122. For example, when the memory associated with EM table(s) 122 goes over a utilization threshold, network device 102 prohibits storage of additional addresses in EM table(s) 122 and attempts for storage of such additional addresses may return an error. Using a high threshold may avoid this situation by detecting when the memory of EM table(s) 122 reaches a certain utilization threshold.

The memory 118 of network device 102 compresses a plurality of routes into a single compressed route. Forwarding engine 120 is configured to traverse a set of memory locations in a plurality of data structures to determine a route among the plurality of routes along which data packet 110 is to be sent. As a result of compressing a plurality of routes into a single route, network device 102 can store a larger number of routes with the same amount of memory space. In some embodiments, network device 102 may achieve an 8:1 compression ratio, greatly increasing the number of routes stored for a given amount of available memory.

Figure 2:
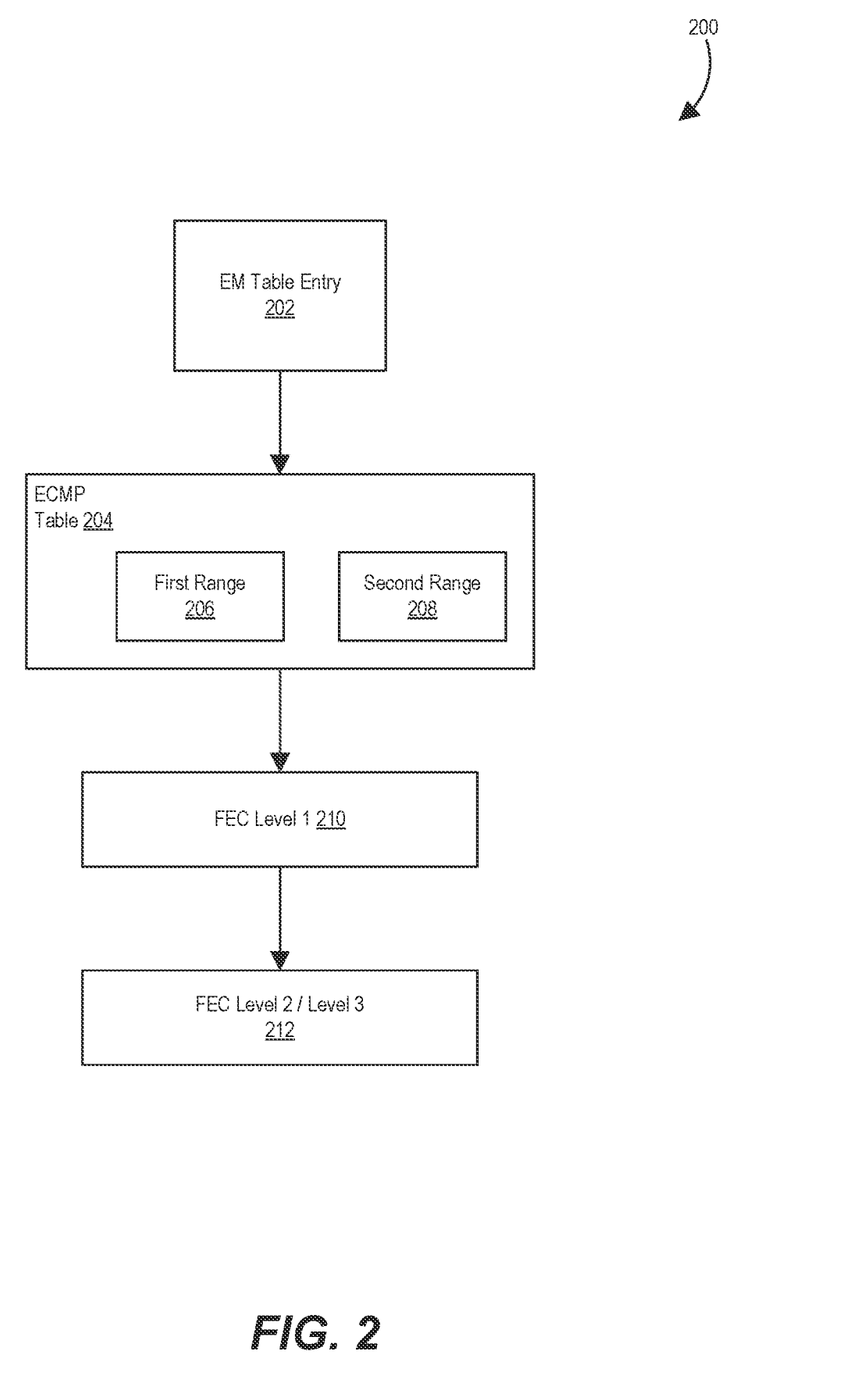
FIG. 2 illustrates an example flow diagram for determining a route based on a compressed route indicated in a data packet header according to one or more embodiments.

FIG. 2 illustrates flow diagram 200 for determining a route based on a compressed route indicated in a data packet header according to one or more embodiments. Forwarding engine 120 receives or obtains a destination IP address included in data packet 110 and references data structures stored in memory 118 based on the destination IP address. Forwarding engine 120 accesses EM table entry 202 in which a plurality of FECs are stored for a corresponding plurality of candidate routes. Forwarding engine 120 selects one of the FECs based on the destination IP address, the FEC selected having an association with an entry in equal cost multi-path (ECMP) table 204.

A FEC, as used herein, refers to a set of data packets that are routed to the same destination in the same way and from the same interface. In some embodiments, the set of data packets corresponding to a FEC may all be routed using the same path or, in the case of load sharing, the same group of paths. A FEC may be characterized by an IP destination or by a superset of IP destinations to which data packets attached thereto are routed. The FEC of a data packet may be determined by an ingress edge device of a network, such as an ingress provider edge device of a VRF system. A FEC of a data packet may correspond to a prefix or subnet mask, which may be represented as a classless inter-domain routing (CIDR) identifier (e.g., 10.1.1.0/24).

ECMP table 204 includes first range 206 of memory locations and second range 208 of memory locations. ECMP table 204 may have a fixed size or number of memory locations—for instance, ECMP table 204 may consist of ~32k memory locations (e.g., 32,768 locations). Each of the memory locations of ECMP table 204 may be 15 bits in length. First range 206 has a first defined number of memory locations. In some embodiments, first range 206 may have 1024 memory locations (e.g., locations 0 to 1023 of ECMP table 204). Second range 208 may comprise a remainder of the memory locations of ECMP table 204. For instance, second range 208 may have ~31k memory locations (e.g., 31744 locations). First range 206 is a collection of reserved memory locations that are used to redirect or mirror FECs in a FEC table. Second range 208 may include one or more subranges to reference FECs in a FEC table.

Forwarding engine 120 accesses a ECMP FEC in first range 206 based on the FEC selected in EM table entry 202. Based on the ECMP FEC accessed in first range 206, forwarding engine 120 accesses a FEC in first level 210 of a FEC table. In some implementations, the FEC accessed in first level 210 may store information regarding the route for sending data packet 110. In some implementations, the FEC accessed in first level 210 may have an association with a location in second or third level 212 of the FEC table. Forwarding engine 120 may access the location in the second or third level 212 storing information regarding the route for sending data packet 110.

Figure 3:
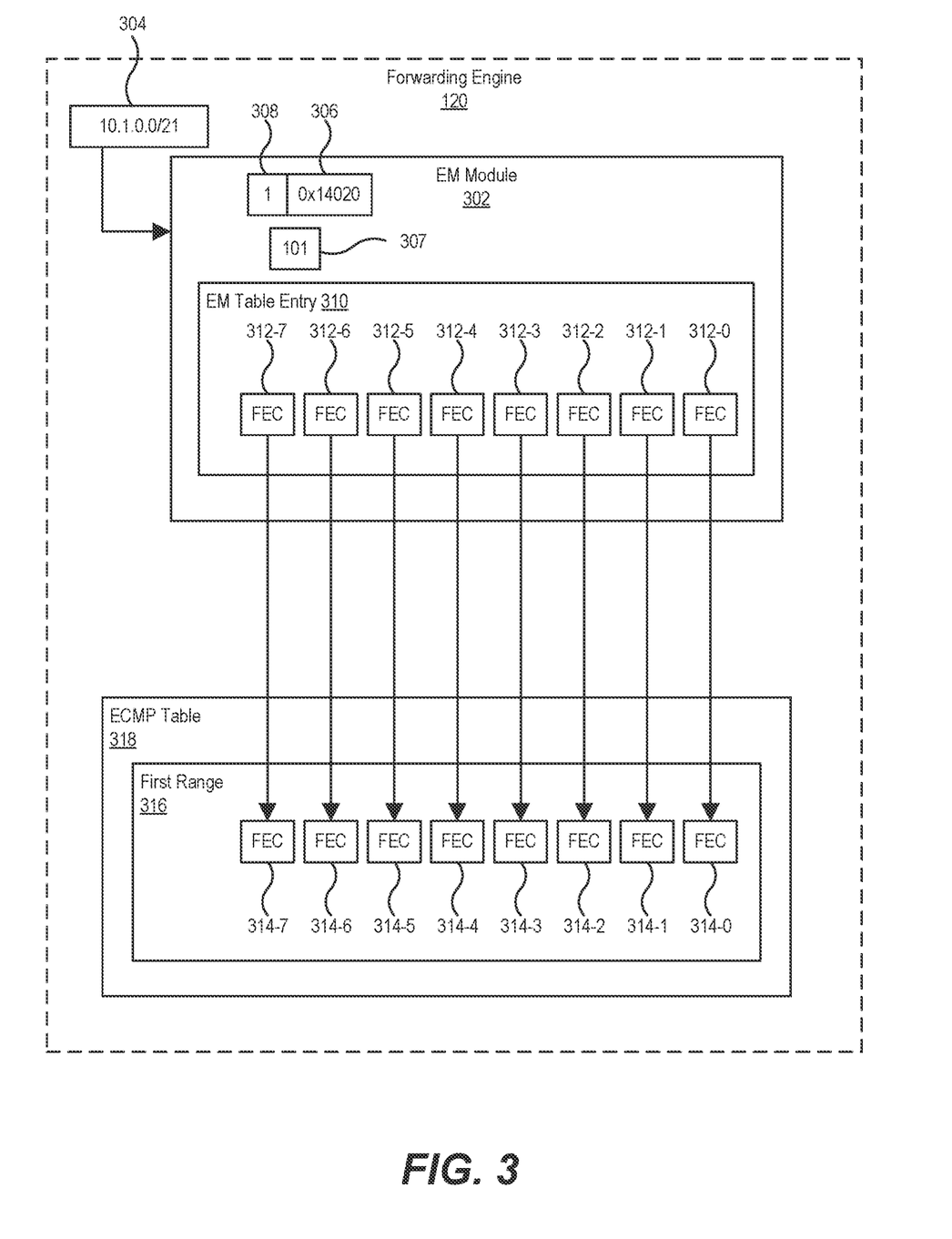
FIG. 3 illustrates an example of an Exact Match module of a forwarding engine implemented by a network device according to one or more embodiments.

FIG. 3 illustrates an example of an EM module 302 of a forwarding engine implemented by a network device according to one or more embodiments. EM module 302 may be implemented as logic executing on one or more processors 116 of network device 102 of FIG. 1. In some embodiments, EM module 302 may be a collection of executable instructions (e.g., software, firmware, or a combination thereof) or circuitry that causes network device 102 to perform as described herein.

EM module 302 receives or obtains destination information 304 included in data packet 110 in FIG. 1. Destination information 304 includes at least a portion of a destination IP address of device(s) 106 to which data packet 110 is addressed. The destination IP address may have a format according to an internet protocol, such as IPv4. Forwarding engine 120 processes destination information 304 to obtain first set of destination IP bits 306, which are shown in hexadecimal notation in FIG. 3. First set of destination IP bits 306 consists of a defined number of bits and is used as a parameter for an EM lookup key. In some embodiments, the defined number of bits of destination IP bits 306 is 21. Destination information 304 may be generated based on a data packet (e.g., data packet 110) sent by a source device (e.g., host device) communicatively coupled to the layer 3 network. Destination information 304 includes a subnet mask (e.g., /21) that may be included or provided by a network device of the Layer 3 network.

EM module 302 includes EM table entry 310 comprising plurality of Forwarding Equivalence Class (FEC) entries 312-0, 312-1, 312-2, . . . 312-N. There are eight FEC entries 312 shown in FIG. 3; however, the number of FEC entries 312 may be different in some embodiments based, e.g., on a desired compression ratio. EM module 302 receives or obtains second set of bits 307 based on data packet 110. Second set of bits 307 include two or more bits that are used to select one of FEC entries 312. Second set of bits 307, in some embodiments, includes 3 bits. The value of second set of bits 307 is obtained from or based on a specific set of bits of the destination IP address of data packet 110. In some embodiments, the values of second set of bits 307 respectively correspond to values of the bits 21, 22, and 23 of the destination IP address of data packet 110, as described with respect to FIG. 4 and elsewhere herein.

EM module 302 processes destination information 304 to obtain Virtual Routing and Forwarding (VRF) data 308 specifying information regarding a VRF route associated with data packet 110 in some embodiments. For instance, VRF data 308 may include an identifier of a VRF route through which data packet 110 is to be conveyed. Network device 102 may encapsulate data packet 110 (e.g., with an overlay, with an underlay) based on VRF data 308.

Figure 4:
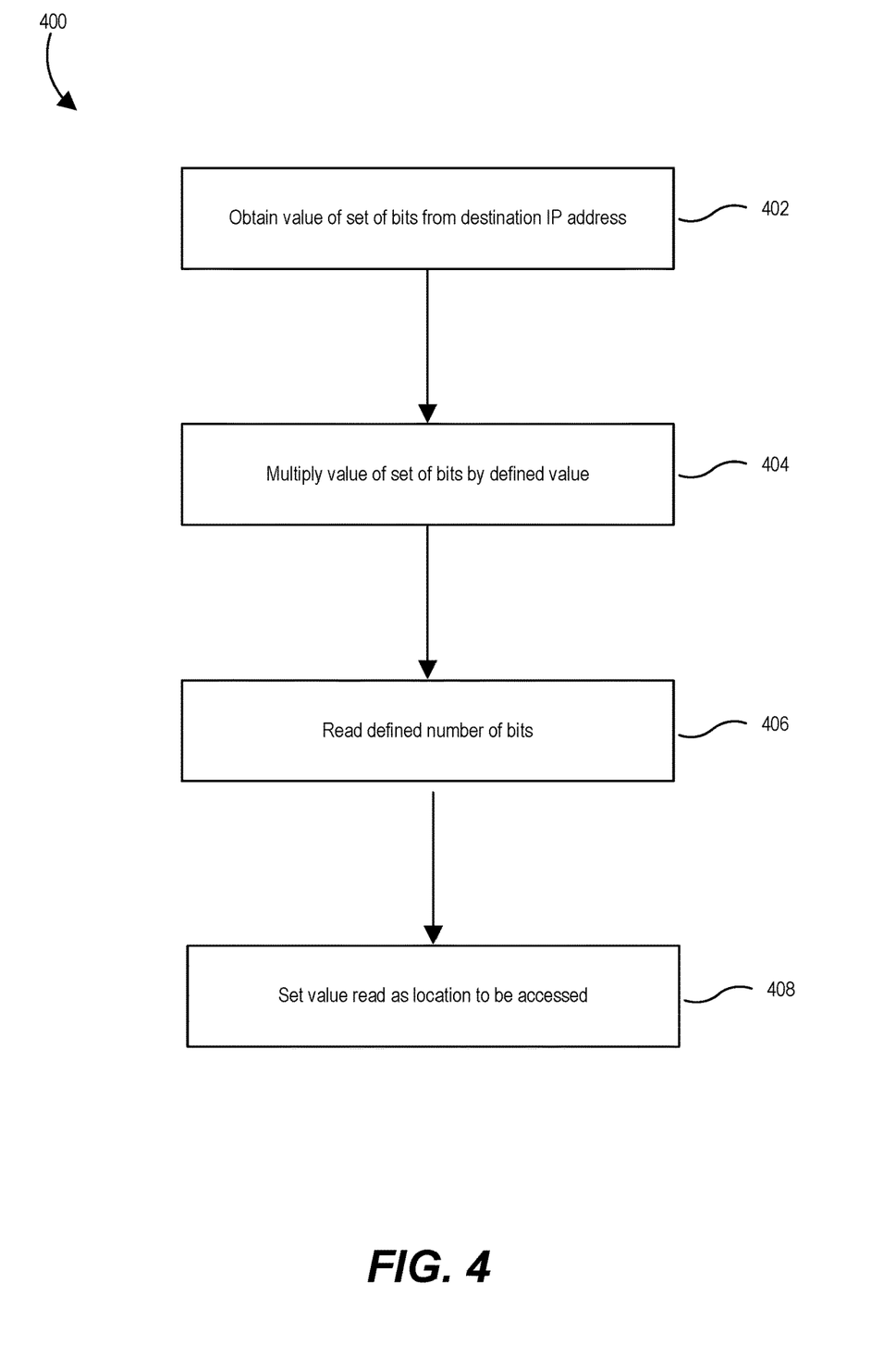
FIG. 4 illustrates a method for processing a destination IP address to obtain a set of bits to be used for obtaining a lookup result according to one or more embodiments.

FIG. 4 shows method 400 for processing a destination IP address to obtain a set of bits to be used for obtaining a lookup result according to one or more embodiments. Method 400 may be performed by any appropriate entity described herein, such as forwarding engine 120. Method 400 involves a defined set of operations that generate a result that is used to select a FEC among FEC entries 312 for obtaining routing information for a data packet received. Method 400 includes obtaining, at 402, a value corresponding to a certain set of bits from the destination IP address. The value obtained in 402 corresponds, in this non-limiting example, to values of bits 21, 22, and 23 of the destination IP address (assuming the bit counting starts from bit 0). The set of bits 21, 22, and 23 collectively correspond to a value between zero and seven (0-7).

Method 400 also includes multiplying, at 404, the value obtained in 402 by a defined value. For instance, the value obtained in 402 may be multiplied by 10. Multiplying the value obtained is used as an offset to the FEC in the 80-bit FEC indices field. Method 400 further includes reading, at 406, a defined number of bits based on the result obtained in 404. The defined number of bits may be 10 bits in at least some embodiments. In 406, a result of the multiplication performed in 404 is used as an offset from which the defined number of bits is read. As a specific non-limiting example, a value of six (binary "110") may be obtained in 402 and, for a defined value of 10 used in 404, an offset of sixty is used as an offset for the FEC indices field. In 406, a defined number of bits may be read beginning at bit 60 in the 80-bit FEC indices field. Method 400 further includes setting, at 408, a value read from the defined number of bits read in 406 as a location to be accessed in first range 316 of ECMP table 318.

In some embodiments, each of the FEC entries 312 corresponds to a particular subnet mask. As a non-limiting example, each of FEC entries 312 may correspond to a subnet mask 10.0.X.0/24, wherein X corresponds to the FEC index place value. FEC entry 312-0 may correspond to a subnet mask 10.0.0.0/24, FEC entry 312-1 may correspond to a subnet mask 10.0.1.0/24, FEC entry 312-2 may correspond to a subnet mask 10.0.2.0/24, FEC entry 312-3 may correspond to a subnet mask 10.0.3.0/24, FEC entry 312-4 may correspond to a subnet mask 10.0.4.0/24, FEC entry 312-5 may correspond to a subnet mask 10.0.5.0/24, FEC entry 312-6 may correspond to a subnet mask 10.0.6.0/24, and FEC entry 312-7 may correspond to a subnet mask 10.0.7.0/24.

Figure 5:
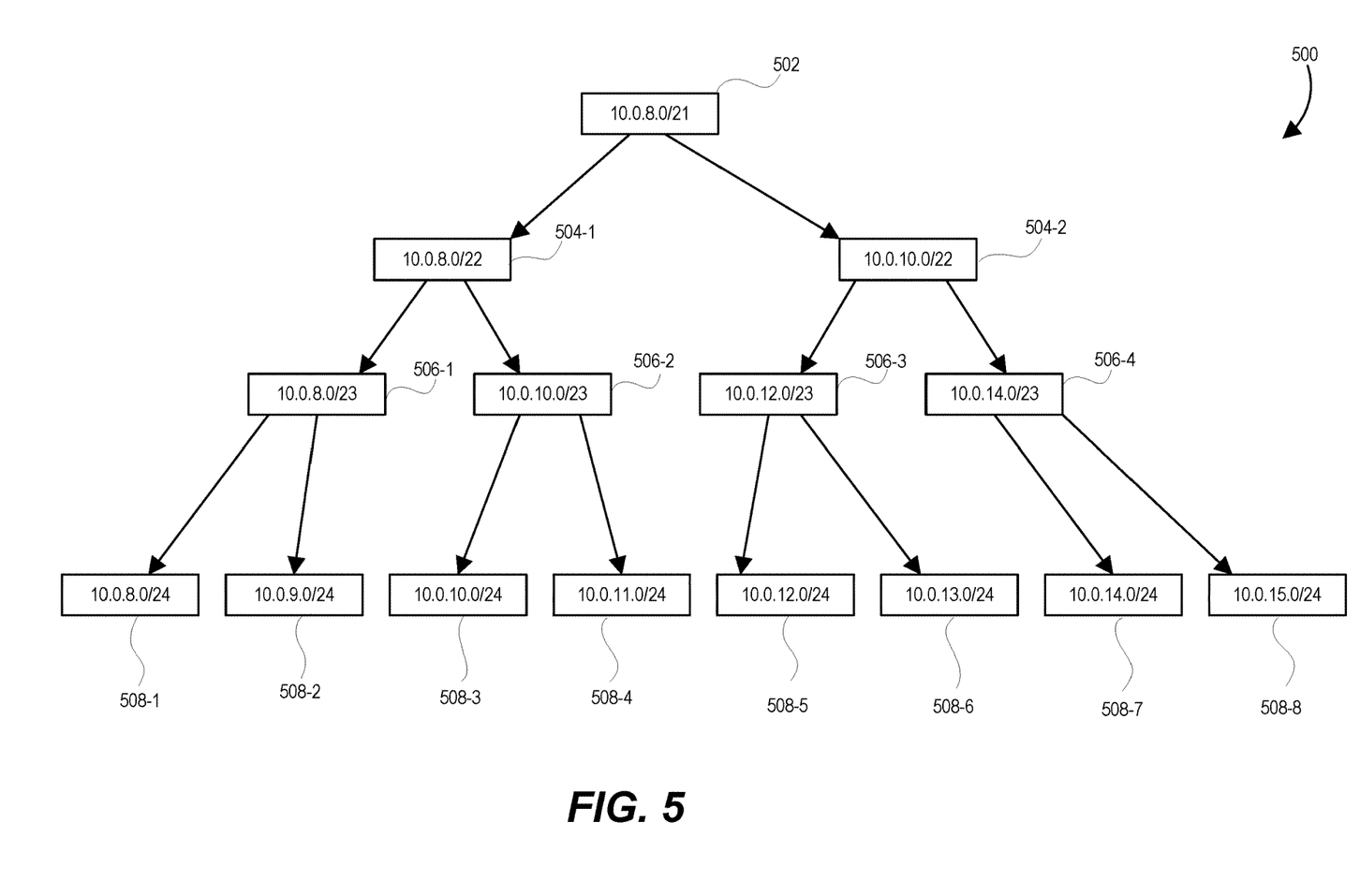
FIG. 5 illustrates a diagram illustrating associations between subnet masks stored in an Exact Match table according to one or more embodiments.

For each /21 subnet mask of EM table entry 310, there are a corresponding number of /22 subnet masks, a corresponding number of /23 subnet masks, and a corresponding number of /24 subnet masks, which may be hierarchically arranged in memory 118. FIG. 5 shows diagram 500 illustrating associations between /21, /22, /23, and /24 subnet masks stored in memory 118. The subnet masks may be stored in EM table entry 310, an ECMP table, and/or a FEC table, as described with respect to FIG. 6 and elsewhere herein. In diagram 500, one /21 subnet mask 502 is associated with two /22 subnet masks 504-1 and 504-2. Subnet mask 504-1 is associated with two /23 subnet masks 506-1 and 506-2. Subnet mask 504-2 is associated with two /23 subnet masks 506-3 and 506-4. Subnet mask 506-1 is associated with two /24 subnet masks 508-1 and 508-2. Subnet mask 506-2 is associated with two /24 subnet masks 508-3 and 508-4. Subnet mask 506-3 is associated with two /24 subnet masks 508-5 and 508-6. Subnet mask 506-4 is associated with two /24 subnet masks 508-7 and 508-8.

Returning again to FIG. 3, specific entries of FEC entries 312 have associations with certain corresponding table entries in memory 118 of network device 102. More particularly, FEC entries 312 each store a 10-bit value that references or points to FEC entries 314 in first range 316 of ECMP table 318. FEC entry 312-0 has an association with ECMP FEC 314-0 in ECMP table 318, FEC entry 312-1 has an association with ECMP FEC 314-1 in ECMP table 318, FEC entry 312-2 has an association with ECMP FEC 314-2 in ECMP table 318, FEC entry 312-3 has an association with ECMP FEC 314-3 in ECMP table 318, and so on. ECMP FECs 314 also store FEC values, as discussed herein.

Forwarding engine 120 accesses one of FEC entries 312 based on a value obtained from second set of bits 307, as described with respect to 402 of method 400. In at least some embodiments, the value obtained in 402 has a value between zero and seven (0-7). Forwarding engine 120 selects one of FEC entries 312 that corresponds to the value obtained. For instance, the value of second set of bits 307 obtained from the set of destination IP addresses of data packet 110 may be five (i.e., binary value 101). Based on the value of five, forwarding engine 120 may access FEC entry 312-5, which points to or references ECMP FEC 314-5 in first range 316.

Figure 6:
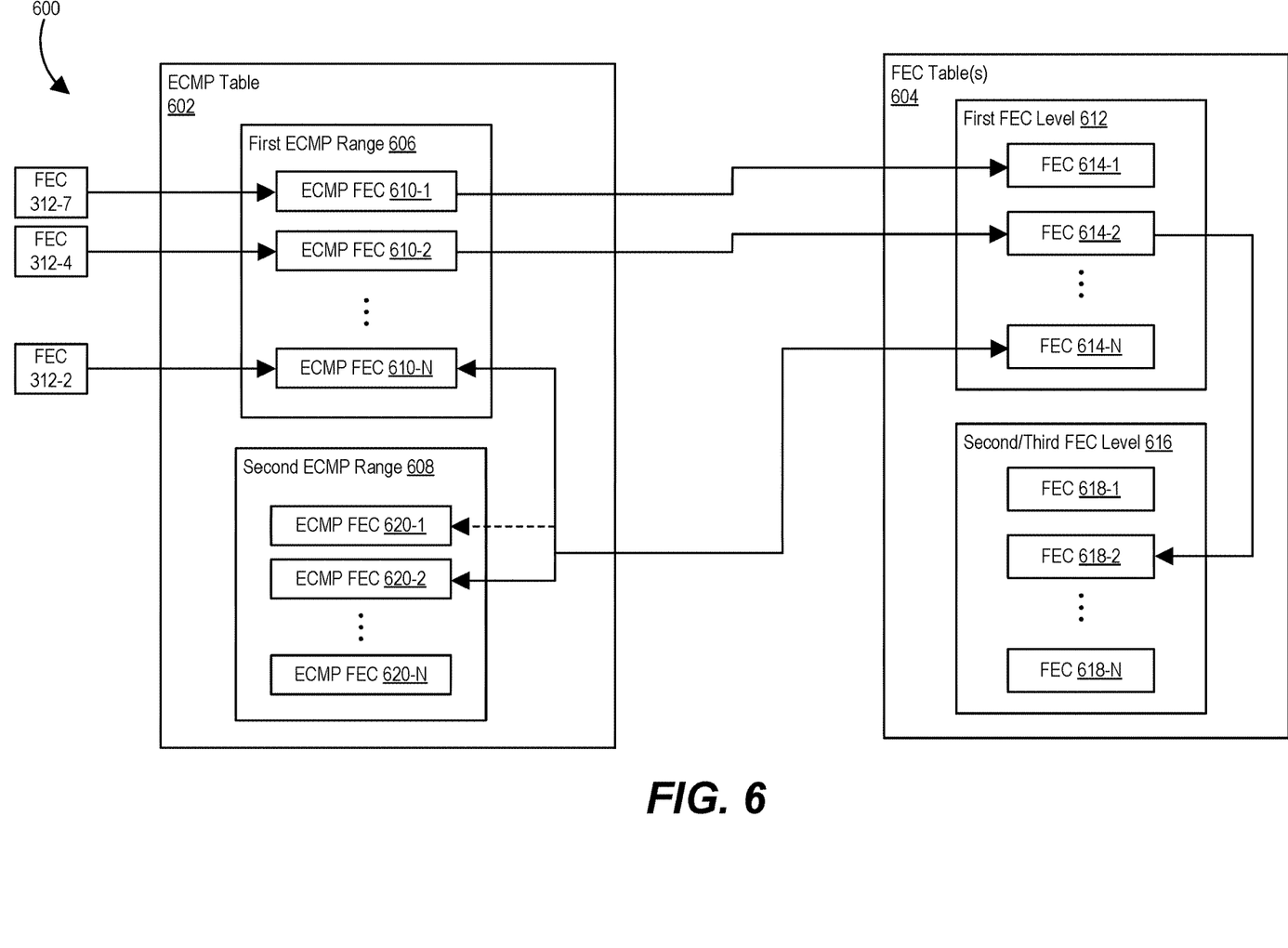
FIG. 6 illustrates an example environment in which a set of data structures are associated with an Exact Match table according to one or more embodiments.

FIG. 6 illustrates environment 600 in which a set of data structures are associated with an EM table according to one or more embodiments. Environment 600 includes ECMP table 602 and FEC table 604 stored in memory 118 of network device 102. Forwarding engine 120 accesses ECMP table 602 in connection with processing a received data packet as described with respect to FIGS. 1, 3, and elsewhere herein. ECMP table 602 includes first range 606 of ECMP table entries and second range 608 of ECMP table entries separate from the first range 606. Memory 118 of network device 102 may be configured to store a maximum number of ECMP entries in ECMP table 602. For instance, memory 118 allocated for ECMP table 602 may be sufficient to store ~32k entries.

Forwarding engine 120 is configured to access EM table entry 310 but may be unable to directly access ECMP table 602 or FEC table 604. In the present disclosure, the FECs in various tables described herein enable access to a greater number of FECs stored in memory 118 of network device 102 and facilitate storage of and access to a larger number of routes via exact match techniques using prefix compression.

ECMP table 602 includes first ECMP range 606 corresponding to first range 316 described with respect to FIG. 3. First ECMP range 606 has a defined number of storage locations, each storage location consisting of a defined number of bits. For instance, first ECMP range 606 may have 1024 memory locations. ECMP table 602 may also include second ECMP range 608 that is separate from and does not overlap with first ECMP range 606. The memory locations in second ECMP range 608 are exclusive of the memory locations of first ECMP range 606. Second ECMP range 608 may include a different number of memory locations than first ECMP range 606. For instance, first ECMP range 606 may include memory locations 0 to 1,023 whereas second ECMP range 608 may include the remaining memory locations of ECMP table 602 (e.g., locations 1,024 to 32,767).

First ECMP range 606 stores a plurality of ECMP FECs 610-1, 610-2, . . . 610-N (collectively "ECMP FECs 610"), each of ECMP FECs 610 storing up to a defined number of bits. At least some of ECMP FECs 610 store associations with FECs stored in first FEC level 612 of FEC table 604. Each of the associations in ECMP FECs 610 may be a pointer to or otherwise reference a corresponding FEC of plurality of FECs 614-1, 614-2, . . . 614-N stored in first FEC level 612. Some of ECMP FECs 610 are associated with FEC entries 312 discussed with respect to FIG. 3. FEC 312-7 of EM table entry 310, for instance, may point to or reference ECMP FEC 610-1 in first ECMP range 606; FEC 312-4 may point to or reference ECMP FEC 610-2; and FEC 312-2 may point to or reference ECMP FEC 610-N.

At least some of ECMP FECs 610 store pointers or otherwise reference set of FECs 614 in first FEC level 612 of FEC table 604. ECMP FEC 610-1 stores a pointer or reference to FEC 614-1, ECMP FEC 610-2 stores a pointer or reference to FEC 614-2, and ECMP FEC 610-N stores a pointer or reference to FEC 614-N. Although ECMP FECs 610 shown have numerical associations with FECs 614 (e.g., 610-1 with 614-1, 610-2 with 614-2), such numerical associations are provided for ease of description and may not be implemented in some implementations. For instance, ECMP FEC 610-1 may have an association with FEC 614-50 (not shown) of FEC table 604, ECMP FEC 610-20 (not shown) may have an association with FEC 614-1, or ECMP FEC 610-N may have an association with FEC 614-2.

In some embodiments, FEC table 604 includes one or more FEC levels in addition to first FEC level 612. FEC table 604, for instance, includes second FEC level 616 storing a plurality of FECs 618-1, 618-2, . . . 618-N (collectively "FECs 618"). One or more FEC levels in addition to first FEC level 612 may include a third FEC level 616 storing some of the plurality of FECs 618. Set of FECs 614 included in first FEC level 612 may store pointers or references to a set of the FECs 618 in second or third FEC level 616.

In some embodiments, the content of one ECMP FEC in ECMP table 602 may be mirrored to ECMP FEC 610 in first ECMP range 606. Second ECMP range 608 includes a plurality of ECMP FECs 620-1, 620-2, . . . 620-N (collectively "ECMP FECs 620"). Second ECMP range 608 may include memory locations greater than a certain memory location relative to the last memory location of ECMP table 602. In network device 102, for example, memory locations numbered 1024 and above may be directly inaccessible from the result of an EM lookup in forwarding engine 120. Contents of one or more of ECMP FECs 620 may be mirrored to individual ones of ECMP FECs 610 to enable utilization of FECs 620 in second ECMP range 608 for route exact match purposes. Contents of ECMP FEC 620-2, which may have a memory location of 1025 relative to memory location 0 of ECMP FEC 610-1, may be mirrored to ECMP FEC 610-N, which may have a memory location of 1023 in first ECMP range 606.

Mirroring may be performed by a mirroring agent or client executing on one or more of the processor(s) 116. Memory 118 may store instructions that, as a result of execution by one or more of the processor(s) 116, cause network device 102 to mirror contents of one ECMP FEC to another ECMP FEC. The contents of ECMP FEC 610-N may store a pointer to FEC 614 in first FEC level 612 using a mirroring technique. For instance, forwarding engine 120 may access a pointer stored in ECMP FEC 610-N, which causes forwarding engine 120 to subsequently access FEC 614-N referenced by the pointer.

The mirroring agent or client may be configured to receive external input(s) from a network administrator from the routing protocols indicating a source ECMP FEC of ECMP FECs 620 and a target ECMP FEC of ECMP FECs 610 to which contents of the source ECMP FEC are to be mirrored. The user input may be provided via methods known to those of skill in the art, such as via an input to a command line interface of or connected with the mirroring agent or client. In some embodiments, the mirroring agent may implement a series of user inputs over time based on user inputs in a script or other collection of instructions.

The source and/or target ECMP FECs may be changed via external input. At a first time, the mirroring agent may receive a first external input causing the mirroring agent to mirror contents of ECMP FEC 620-2 to ECMP FEC 610-N. At a second time, the mirroring agent may receive a second external input causing the mirroring agent to change the source ECMP FEC from ECMP FEC 620-2 to ECMP FEC 620-1. In response, the contents of ECMP FEC 620-1 are mirrored to ECMP FEC 610-N instead of the contents of ECMP FEC 620-2. As a result, a larger portion of ECMP table 602 than just first ECMP range 606 may be utilized for exact match routing even though second ECMP range 608 may be directly inaccessible to forwarding engine 120.

Operation of network device 102 will now be described with respect to FIGS. 1 through 6. Data structures (e.g., tables) in memory 118 of network device 102 store information that is usable for redirection or mirroring involving contents of FECs. As described herein, forwarding engine 120 uses the contents stored in various FECs to determine forwarding or routing of data packet 110 using prefix compression for route exact match techniques. With reference to FIGS. 1 and 3, network device 102 receives data packet 110 and obtains set of destination IP bits 306. Forwarding engine 120 identifies FEC entries 312 in EM table entry 310 and accesses one of FEC entries 312 based on a 3-bit value derived from the destination IP bits 306, as described with respect to FIG. 4 and elsewhere herein. The term "prefix compression," as used herein, refers to compression of a plurality of network routes into a single network route in memory of a network device. The compressed routes may be stored in and/or retrieved from memory of the network device. In some embodiments, a compression ratio of the plurality of network routes to the single network route may be greater than a 2:1 ratio—for example, a 4:1 ratio or an 8:1 ratio.

In network device 102, routing information stored in EM table entry 310 cannot directly point to a FEC stored in FEC table 604. An ECMP FEC is allocated in first ECMP range 606 to link FECs in EM table entry 310 with FECs in FEC table 604. In a first implementation, route exact match information is stored in an ordinary FEC in first level 612 of FEC table 604. As described with respect to FIG. 3, forwarding engine 120 may select and access FEC 312-7 in EM table entry 310 based on the destination IP bits. FEC 312-7 stores a pointer or reference to ECMP FEC 314-7 in first range 316 of ECMP table 318.

In FIG. 6, FEC 312-7 points to ECMP FEC 610-1, which corresponds to ECMP FEC 314-7 of FIG. 3. Forwarding engine 120 then accesses ECMP FEC 610-1, which stores a pointer or reference to FEC 614-1 in first FEC level 612. FEC 614-1 may store a FEC that forwarding engine 120 uses to determine routing for data packet 110, such as a port of plurality of ports 128 from which data packet 110 should be sent (see FIG. 1). FEC 614-1 may store a next-hop and rewrite information corresponding to the subnet mask (e.g., subnet mask 508-1 of FIG. 5) in some embodiments.

In a second implementation, forwarding engine 120 may select and access FEC 312-4 in EM table entry 310 based on the destination IP bits. FEC 312-4 stores a pointer or reference to ECMP FEC 314-4 in first range 316 of ECMP table 318. In FIG. 6, FEC 312-4 points to ECMP FEC 610-2, which corresponds to ECMP FEC 314-4 of FIG. 3. Forwarding engine 120 then accesses ECMP FEC 610-2, which stores a pointer or reference to FEC 614-2 in first FEC level 612 of FEC table 604. FEC 614-2 stores a pointer or reference to FEC 618-2 in second or third FEC level 616 of FEC table 604. Forwarding engine 120 accesses FEC 618-2 in second/third FEC level 616 that forwarding engine 120 uses to determine routing for data packet 110, such as a port of plurality of ports 128 from which data packet 110 should be sent (see FIG. 1). In some embodiments, FEC 618-2 may be an ordinary FEC in level 2 or level 3 of FEC table 604. In some embodiments, FEC 618-2 may be an ECMP FEC in level 2 or 3 of ECMP table 602 in second ECMP range 608. FEC 618-2 may store a next-hop and rewrite information corresponding to the subnet mask (e.g., subnet mask 508-4 of FIG. 5) in some embodiments.

In network device 102, routing information stored in EM table entry 310 cannot directly point to a FEC stored in memory locations numbered greater than 1023 (relative to a first storage location 0 in first ECMP range 606). For instance, FEC entries 312 cannot directly reference or point to ECMP FECs 620 in second ECMP range 608. An ECMP FEC is therefore allocated in first ECMP range 606 to which content of ECMP FEC 620 in second ECMP range 608 is mirrored. This facilitates using a greater number of ECMP FECs than those accessible via FEC entries 312.

In some implementations, for instance, route exact match information stored in an ECMP FEC in first FEC level 612 of FEC table 604 is accessed using ECMP FEC 610-N. As described with respect to FIG. 3, forwarding engine 120 may select and access FEC 312-2 in EM table entry 310 based on the destination IP bits. FEC 312-2 stores a pointer or reference to ECMP FEC 314-N in first range 316 of ECMP table 318.

In FIG. 6, FEC 312-2 points to ECMP FEC 610-N, which corresponds to ECMP FEC 314-1 of FIG. 3. Content stored in ECMP FEC 620-2 in second ECMP range 608 is mirrored to and stored in ECMP FEC 610-N. Forwarding engine 120 accesses ECMP FEC 610-N, which stores a pointer to FEC 614-N in first FEC level 612. Forwarding engine 120 accesses FEC 614-N using ECMP FEC 610-N and uses the content stored in FEC 614-N to determine routing for data packet 110, such as a port of plurality of ports 128 from which data packet 110 should be sent (see FIG. 1). In some embodiments, FEC 614-N may be an ordinary FEC in first FEC level 612 of FEC table 604. In some embodiments, FEC 614-N may point to or reference one of FECs 618 in second or third FEC level 616 of FEC table 604. FEC 618-2 may store a next-hop and rewrite information corresponding to a subnet mask (e.g., subnet mask 508-7 of FIG. 5) in some embodiments.

Figure 7:
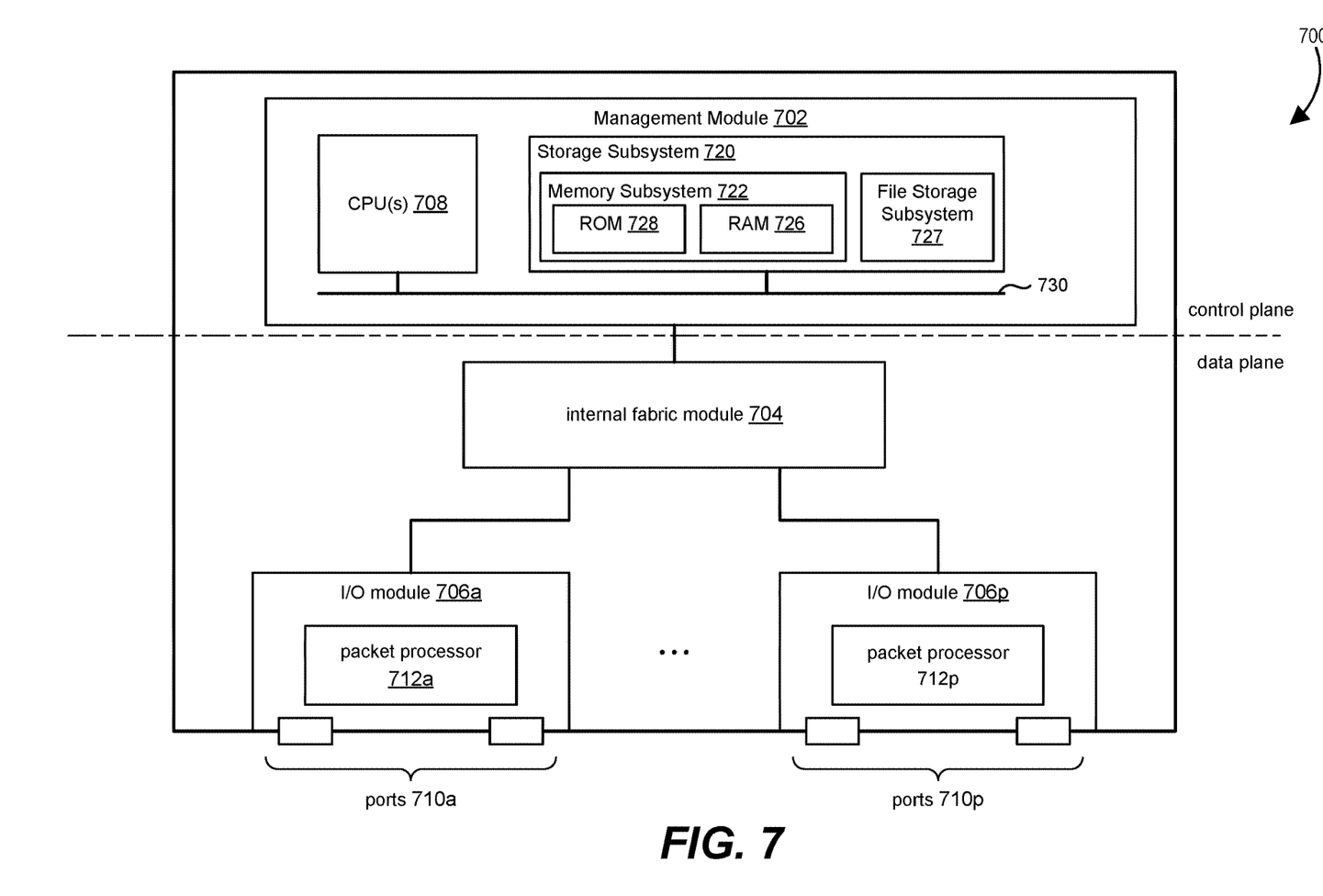
FIG. 7 illustrates a network device that is adapted to operate according to one or more embodiments of the present disclosure.

FIG. 7 illustrates network device 700 that is adapted to operate according to one or more embodiments of the present disclosure. Network device 700 may be a switch or a router, for example. As shown, network device 700 can include management module 702, internal fabric module 704, and one or more I/O modules 706a-706p. Management module 702 may operate in a control plane (also referred to as control layer) of network device 700 and can include one or more management CPUs 708 for managing and controlling operation of network device 700 in accordance with the present disclosure. Each management CPU 708 can be a general-purpose processor, such as an Intel®/AMD® x86-64 or ARM® processor, that operates under the control of software stored in memory, such as storage subsystem 720 and memory subsystem 722, which may include read-only memory 728 and/or random-access memory 726, and/or file storage subsystem 727. In some embodiments, CPU 708 may include control circuitry, and may include or be coupled to a non-transitory storage medium storing encoded instructions that cause CPU 708 to perform operations described herein. In some embodiments, the non-transitory storage medium may include encoded logic or hardwired logic for controlling operation of CPU 708. The control plane refers to all the functions and processes that determine which path to use, such as routing protocols, spanning tree, and the like. Each network device 700 can include multiple elements that may be electrically coupled via a bus 730.

Internal fabric module 704 and I/O modules 706a-706p collectively represent the data plane of network device 700 (also referred to as data layer, forwarding plane, etc.). Internal fabric module 704 is configured to interconnect the various other modules of network device 700. Each I/O module 706a-706p includes one or more input/output ports 710a-710p that are used by network device 700 to send and receive network packets. Each I/O module 706a-706p can also include packet processor 712a-712p. Each packet processor 712a-712p can comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Embodiments described herein may be combined with other embodiments herein to create additional embodiments. In some aspects, the techniques described herein relate to a network device including: a plurality of network interfaces including a first network interface and a second network interface; at least one processor; and at least one memory that stores: a first table having a first plurality of entries that include a first entry; a second table having a second plurality of entries that include a second entry; and a third table having a third plurality of entries, wherein the first entry references a second memory location in the second table, the second memory location stores the second entry, and the second entry references a third memory location in the third table, the third memory location stores the third entry, said third entry including routing information; said network device configured to: receive a data packet via the first network interface; access the first entry based on a destination address of the data packet; obtain the routing information as a result of accessing the first entry; and send, from the second network interface, the data packet according to the routing information.

In some aspects, the techniques described herein relate to a network device, the network device further configured to: access the second memory location as a result of accessing the first entry; and access the third memory location as a result of accessing the first memory location.

In some aspects, the techniques described herein relate to a network device, wherein the first table is an exact match (EM) table and the third table is a forwarding equivalence class (FEC) table.

In some aspects, the techniques described herein relate to a network device, wherein the second table is an equal cost multi-path (ECMP) table.

In some aspects, the techniques described herein relate to a network device, wherein the at least one memory further stores: a fourth entry in the third table referencing a fourth memory location in the third table, the network device configured to: access the third entry via the fourth entry.

In some aspects, the techniques described herein relate to a network device, wherein the memory further stores: a fifth plurality of entries in the second table, the fifth plurality of entries having memory locations after the second plurality of memory locations, said fifth plurality of entries including a fifth entry stored in a fifth memory location in the second table, the fifth entry referencing the third memory location, the network device configured to: mirror content of the fifth entry to the second entry, wherein the routing information is obtained as a result of the content being mirrored to the second entry.

In some aspects, the techniques described herein relate to a network device, the network device further configured to: determine a subset of bits of the destination address; and multiply the subset of bits by a defined value to obtain a result, wherein the first entry is accessed based on the result.

In some aspects, the techniques described herein relate to a method for routing a data packet using prefix compression including: configuring at least one non-transitory computer-readable media of a network device to store: a first table having a first entry; a second table having a second entry; and a third table having a third entry, wherein the first entry references a second memory location in the second table storing the second entry, and the second entry references a third memory location in the third table storing the third entry, said third entry including routing information; receiving, by the network device, the data packet; accessing the routing information via the first entry based on a destination address of the data packet; and sending the data packet over a network using the routing information.

In some aspects, the techniques described herein relate to a method, wherein the first table is an exact match (EM) table, the second table is an equal cost multi-path (ECMP) table, and the third table is a Forwarding Equivalence Class (FEC) table.

In some aspects, the techniques described herein relate to a method, further including: configuring the at least one non-transitory computer-readable media of the network device to include: a fourth entry in the third table, the fourth entry referencing the third memory location in the third table; and accessing the third entry via the fourth entry as a result of accessing the first entry.

In some aspects, the techniques described herein relate to a method, wherein the fourth entry is stored in a first forwarding equivalence class (FEC) level of the third table, and the third entry is stored in a second FEC level of the third table separate from the first FEC level.

In some aspects, the techniques described herein relate to a method, further including: configuring the memory to include a fifth plurality of entries in the second table, the fifth plurality of entries having memory locations after the second plurality of entries and including a fifth entry stored in a fifth memory location in the second table, the fifth entry referencing the third memory location; and mirroring content of the fifth entry to the second entry.

In some aspects, the techniques described herein relate to a method, further including: accessing the second memory location as a result of redirection from the first entry; and accessing the third memory location as a result of redirection from the second entry.

In some aspects, the techniques described herein relate to a method, further including: determining a first subset of bits and a second subset of bits of the destination address; and accessing the first entry in the first table based on the first subset of bits and the second subset of bits.

In some aspects, the techniques described herein relate to a method, further including multiplying a value of the second subset of bits to access the first entry.

In some aspects, the techniques described herein relate to one or more non-transitory computer readable media storing instructions that, as a result of execution by one or more processors, cause the one or more processors to: receive a data packet; determine a first subset of bits from a destination IP address in the data packet; determine a second subset of bits of the destination address in the data packet; access a first entry in a first table based on the first subset of bits and the second subset of bits; redirect to a second entry in a second table based on a reference to a second memory location in the first entry; redirect to a third entry in a third table based on a reference to a third memory location in the second entry; and send the data packet over a network using routing information accessed via the third entry.

In some aspects, the techniques described herein relate to one or more non-transitory computer readable media, execution of the instructions causing the one or more processors to: mirror content of a fifth entry in the second table to the second entry, the fifth entry referencing the third memory location, wherein the routing information is obtained as a result of the content being mirrored to the second entry.

In some aspects, the techniques described herein relate to one or more non-transitory computer readable media, execution of the instructions causing the one or more processors to: redirect to a third entry in the third table based on a reference to a third memory location in the fourth entry, wherein the routing information is stored in the third entry.

In some aspects, the techniques described herein relate to one or more non-transitory computer readable media, wherein the data packet is received over a Layer 3 network, and the data packet is sent over a Layer 2 network.

In some aspects, the techniques described herein relate to one or more non-transitory computer readable media, wherein the first table is an exact match table, the second table is an equal cost multi-path (ECMP) table, and the third table is a forwarding equivalence class (FEC) table.

The various embodiments further can be implemented in a wide variety of operating environments, which in some cases can include one or more user computers, computing devices or processing devices, which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices may include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Conjunctive language, such as phrases of the form "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

The invention claimed is:

1. A network device routing a data packet using prefix compression comprising:
   a plurality of network interfaces;
   at least one processor; and
   at least one memory that stores:
   an exact match (EM) table having a first plurality of entries;
   an equal cost multi-path (ECMP) table having a second plurality of entries; and
   a forwarding equivalence class (FEC) table having a third plurality of entries,
   wherein entries in the EM table are used to access entries in the ECMP table and entries in the ECMP table are used to access entries in the FEC table;
   said network device configured to:
   receive the data packet on one of the plurality of network interfaces;
   access an EM entry in the EM table using at most a subset of bits that constitute a destination address of the data packet, wherein the accessed EM entry comprises a plurality of indices to the ECMP table;
   access an ECMP entry in the ECMP table using one of the plurality of indices in the accessed EM entry;
   access a FEC entry in the FEC table using the ECMP entry;
   obtain routing information contained in the FEC entry; and
   transmit the data packet on one of the plurality of network interfaces according to the routing information in the FEC entry.

2. The network device of claim 1, wherein the ECMP entry references an intermediate entry in the FEC table, wherein accessing the FEC entry using the ECMP entry includes:
   accessing the intermediate entry in the FEC table using the reference in the ECMP entry; and
   accessing the FEC entry using a reference in the intermediate entry.

3. The network device of claim 1, wherein a source entry in the ECMP table includes a reference to the FEC entry, the network device further configured to:
   mirror content of the source entry in the ECMP table to the ECMP entry, wherein the routing information is obtained as a result of the content in the source entry being mirrored to the ECMP entry.

4. A network device comprising:
a plurality of network interfaces comprising a first network interface;
at least one processor; and
at least one memory that stores:
an exact match (EM) table having a first plurality of entries that include a first entry;
an equal cost multi-path (ECMP) table having a second plurality of entries that include a second entry; and
a forwarding equivalence class (FEC) table having a third plurality of entries,
said network device configured to:
receive a data packet via the first network interface;
access the first entry in the EM table based on at most a subset of bits that constitute a destination address of the data packet, wherein the accessed first entry comprises a plurality of indices into the ECMP table;
access the second entry in the ECMP table using one of the plurality of indices in the accessed first entry;
access a third entry in the FEC table using the second entry;
obtain routing information contained in the third entry; and
transmit the data packet on one of the plurality of network interfaces according to the routing information.

5. The network device of claim 4, wherein said one of the plurality of network interfaces is a second network interface different from the first network interface.

6. The network device of claim 4, wherein the at least one memory further stores:
a fourth entry in the FEC table referencing the third entry in the FEC table, wherein the second entry references the fourth entry, the network device configured to:
access the third entry via the fourth entry using the second entry.

7. The network device of claim 4, wherein the at least one memory further stores:
a fourth plurality of entries in the ECMP table that includes a source entry that references the third entry in the FEC table, the network device configured to:
mirror content of the source entry to the second entry, wherein the routing information is obtained as a result of the content being mirrored to the second entry.

8. The network device of claim 4, the network device further configured to:
multiply the subset of bits by a defined value to obtain a result, wherein the first entry is accessed based on the result.

9. The network device of claim 4, wherein the data packet is received over a Layer 3 network, and the data packet is sent over a Layer 2 network.

10. A method for routing a data packet using prefix compression comprising:
configuring at least one non-transitory computer-readable media of a network device to store:
an exact match (EM) table having a first entry;
an equal cost multi-path (ECMP) table having a second entry; and
a forwarding equivalence class (FEC) table having a third entry,
wherein the first entry is used to access the second entry, and the second entry is used to access the third entry, the third entry including routing information;
receiving, by the network device, the data packet;
accessing the first entry based on at most a subset of bits that constitute a destination address of the data packet, wherein the accessed first entry comprises a plurality of indices into the ECMP table;
accessing the routing information via the second entry, wherein the second entry is accessed using one of the plurality of indices in the accessed first entry; and
sending the data packet over a network using the routing information.

11. The method of claim 10, further comprising:
configuring the at least one non-transitory computer-readable media of the network device to include:
a fourth entry in the FEC table, the fourth entry referencing the third entry in the FEC table; and
accessing the third entry via the fourth entry as a result of accessing the first entry.

12. The method of claim 11, wherein the fourth entry is stored in a first forwarding equivalence class (FEC) level of the FEC table, and the third entry is stored in a second FEC level of the FEC table separate from the first FEC level.

13. The method of claim 10, further comprising:
configuring the memory to include a source entry in the ECMP table that references the third entry in the FEC table; and
mirroring content of the source entry to the second entry so that the second entry can be used to access the third entry.

14. The method of claim 10, further comprising:
accessing the second entry as a result of redirection from the first entry; and
accessing the third entry as a result of redirection from the second entry.

15. The method of claim 10, further comprising:
determining a first subset of bits and a second subset of bits of the destination address; and
accessing the first entry in the EM table based on the first subset of bits and the second subset of bits.

16. The method of claim 15, further comprising multiplying a value of the second subset of bits to access the first entry.

17. The method of claim 10, wherein the data packet is received over a Layer 3 network, and the data packet is sent over a Layer 2 network.

* * * * *